United States Patent
Di Venere

(10) Patent No.: US 10,788,463 B2
(45) Date of Patent: Sep. 29, 2020

(54) DEVICE FOR THE FRACTIONATION OF OBJECTS AND FRACTIONATION METHOD

(71) Applicant: STEM SEL S.R.L., Bologna (IT)

(72) Inventor: Martina Di Venere, Bologna (IT)

(*) Notice: Subject to any disclaimer, the term of this patent is extended or adjusted under 35 U.S.C. 154(b) by 502 days.

(21) Appl. No.: 15/503,449

(22) PCT Filed: Aug. 14, 2015

(86) PCT No.: PCT/IB2015/056195
§ 371 (c)(1),
(2) Date: Feb. 13, 2017

(87) PCT Pub. No.: WO2016/027204
PCT Pub. Date: Feb. 25, 2016

(65) Prior Publication Data
US 2017/0241959 A1  Aug. 24, 2017

(30) Foreign Application Priority Data
Aug. 20, 2014  (IT) ............... VI2014A0214

(51) Int. Cl.
*B01L 3/00* (2006.01)
*G01N 30/00* (2006.01)
*G01N 1/40* (2006.01)

(52) U.S. Cl.
CPC .... *G01N 30/0005* (2013.01); *B01L 3/502715* (2013.01); *B01L 3/502746* (2013.01);
(Continued)

(58) Field of Classification Search
CPC ............... G01N 30/0005; G01N 30/00; B01L 3/502715; B01L 3/5027; B01L 3/502; B01L 3/50
(Continued)

(56) References Cited

U.S. PATENT DOCUMENTS 7,588,550 B2 * 9/2009 Leonard ............... A61M 1/14
422/44
7,727,399 B2 * 6/2010 Leonard ............... A61M 1/14
210/634
(Continued)

FOREIGN PATENT DOCUMENTS

| JP | 2004-097886 | 4/2004 |
|---|---|---|
| WO | WO 9810267 | 3/1998 |
| WO | WO 2005/023391 | 3/2005 |

OTHER PUBLICATIONS

Giddings et al., Theoretical Analysis of Edge Effect in Field-Flow Fractionation, 1987, Chemical Engineering Science, vol. 42, No. 6, pp. 1471-1479.
(Continued)

*Primary Examiner* — Christine T Mui
(74) *Attorney, Agent, or Firm* — Fattibene and Fattibene LLC; Paul A. Fattibene

(57) ABSTRACT

The present invention relates to a device and a method for dynamic fractionation of a dispersed phase in a fluid. The device comprises a fractionation channel and from a first to a third injection ports. A first and a second confining fluids are injectable through the first and second injection ports, respectively. An elution fluid for transporting the dispersed phase is injectable into the channel through a third injection port which is arranged between the first and second injection ports. An end portion of the channel comprises from a first to a third terminal portion respectively arranged in correspondence to the first to the third injection ports and having a geometry such that the first and second confining fluids respectively have a first and second predefined flow rate and the elution fluid have a third predefined flow rate which is larger than the first and second predefined flow rates.

13 Claims, 11 Drawing Sheets

(52) U.S. Cl.
CPC ........ *B01L 3/502761* (2013.01); *G01N 1/405* (2013.01); *B01L 2200/0605* (2013.01); *B01L 2200/0647* (2013.01); *B01L 2300/0867* (2013.01); *B01L 2300/0887* (2013.01); *B01L 2400/082* (2013.01)

(58) Field of Classification Search
USPC .............. 436/63; 250/251; 422/502, 500, 50
See application file for complete search history.

(56) References Cited

U.S. PATENT DOCUMENTS

| | | | |
|---|---|---|---|
| 8,496,606 B2* | 7/2013 | Leonard | A61M 1/14 604/4.01 |
| 2005/0121604 A1* | 6/2005 | Mueth | A61M 1/36 250/251 |
| 2007/0207548 A1 | 9/2007 | Blankenstein | 436/63 |
| 2008/0067128 A1 | 3/2008 | Hoyos et al. | 210/658 |

OTHER PUBLICATIONS

Neiuwstadt et al, "Microfluidic particle sorting utilizing inertial lift force", Biomed Microdevices, vol. 13, No. 1, Sep. 24, 2010; pp. 97-105.

Janca et al, "Elimination of edge effects in micro-thermal field-flow fractionation channel of low aspect ratio by splitting the carrier liquid flow into the main central stream and the thin stream layers at the side channel walls", Journal of Chromatography, vol. 1068, No. 2, Mar. 18, 2005, pp. 261-268.

Wahlund et al, "Application of an asymmetrical flow field-flow fractionation channel to the separation and characterization of proteins, plasmids, plasmid fragments, polysaccharides and unicellular algae", Journal of Chromatography, vol. 461, Jan. 6, 1989, pp. 73-87.

* cited by examiner (A)

(B)

Superficial trend of the total flow (prior art)

(A)

Superficial trend of the total flow (B)

Superficial trend of the total flow (prior art)

(A)

Superficial trend of the total flow (B)

Superficial trend of the flow velocity (prior art)

(A)

Superficial trend of the flow velocity (B)

Superficial trend of the flow velocity (prior art)

(A)

Superficial trend of the flow velocity (B)

(A)

(B)

DEVICE FOR THE FRACTIONATION OF OBJECTS AND FRACTIONATION METHOD

The present invention is related to a device for the fractionation of objects, especially for biological material, in a dispersing fluid; the present invention is related also to fractionation methods of these organic or inorganic objects, in particular microscopic objects, biological materials and similar, in a dispersing fluid.

STATE OF THE ART

Devices for the fractionation of dispersed objects and particles are known from the prior art. In particular, these devices can be used to fractionate biological material, such as a cellular sample. In this case, particles can be single cells or aggregates of cells, also different from each other.

Despite fractionation devices can be used with any kind of biological material, there is a lot of interest in using such devices to select and isolate stem cells. Therefore, in the following different fractionation methods and devices of public domain, in relation to biological material ad stem cells.

A biotipic initial cell sample to separate is the equivalent of a heterogeneous cell population composed by different cellular species growing in adhesion (upon supports or scaffolds) or in suspension into physiological fluids. From the initial sample can be obtained firstly adherent cells, grown in colture in adherence on plastic supports, and other suspended species, grown in colture dispersed into the dispersing fluid. In particular, mesenchymal stem cells are identified as adherent cells while other suspended species are cells as blood cells, lymphocytes, red blood cells, tumor cells and so on.

Stem cells are "primitive" cells devoted to maintain functional and structural integrity of tissues, by replacement of damaged mature cells. Stem cells can be distinguished on their different ability to differentiate into different kinds of tissues (different degree of "potency") and great perspectives in regenerative medicine that seems to become the future of medical science.

The possibility of simplifying a complicated and heterogeneous sample which comes from real sources and the chance to reuse discarded tissues (as adipose tissue and neonatal tissues), to achieve subpopulations of different cellular species with different purposes for applications ranging from regenerative medicine to diagnostic, is really challenging. In recent years, particular attention is given to the tumor cells as biomarkers in the diagnostic field and to stem cells and blood cells, especially peripheral blood, for their potential to be used as cellular drugs.

Stem cells are distributed in all tissues, and they are mainly placed in sources including bone marrow, dental pulp, adipose tissue, peripheral blood, umbilical cord and fetal membrane, from which stem cells can be selected, but their localization in tissues is not well defined, and they cannot be identified in a specific district isolated from all different cells, which are more differentiated and originated from the stem cells. Currently, the selection/enrichment of human stem cells is performed with immunolabeling techniques that recognize the presence of membrane antigens, or by, gene selection techniques. However the immunolabeling can damage stem cells or induce them toward undesired differentiation processes, as well as the immunolabeling is considered an "hard" cell sorting technique because it does not fulfill the regulations regarding the minimum manipulation to use the analyzed cells not for research but for medical and clinical purposes.

The gene selection, moreover, requires cell genetic modifications that have the known related problems particularly for the in vivo reuse of sorted cells. It is also expensive and presents long procedure times.

The firstly source of totipotent stem cells, which are able to differentiate into any kind of cell and tissue, is the embryo. Anyhow, the experimentation and the use of totipotent stem cells from human embryos is forbidden in some Countries (as in Italy, thanks to the referendum result of June 2005), while in many other countries is severely restricted by in force legislation or discouraged by bioethical considerations (such as in other European Countries or in the United States of America).

Multipotent stem cells, after totipotent stem cells, are the most "staminal", such as mesenchymal stem cells that are able to specialize in a wide variety of tissues present in almost all human tissues.

The low availability of multipotent stem cells in sources different from embryo, requires the use of efficient techniques for their selection/enrichment, in order to obtain an adequate cell number for further applications.

Multipotent stem cells cannot be selected/enriched by direct immunotag or by cell selection techniques involving the use of specific markers, such as Flow-Assisted Cell Sorting (FACS) in flow cytometry or Magnetic-Assisted Cell Sorting (MACS) with immuno-coated magnetic beads, because the selection of these methods is based on the recognition of immunological markers (immunomarkers) typical of cell differentiation proprieties and difficult to identify as the degree of stem cells power increases. For these reasons, a full panel of markers that can certainly identify mesenchymal cells, doesn't exist yet.

In general, mesenchymal stem cells are multipotent cells expressing a very wide and diversified panel of surface antigens, that hinders an accurate distinction based on phenotypic proprieties through direct immunolabeling (W. Wagner et al. Experimental Hematology 33 (2005) 1402-1416).

The techniques FACS and MACS can also induce physiological suffering to the sorted mesenchymal stem cells, relatively low recovery of viable cells, low ability to reproduce and grow and also different power to differentiate, then deviations from the desired differentiation path which can lead to the formation of undesired and cancer tissues.

"Negative" selection techniques, employing immunomarkers for cells that are not mesenchymal stem cells, are used to exclude MSCs from the whole cell population. This technique does not absolutely guarantee the presence of the target cells within the depleted population, since it is not specifically marked thus not bonded to a particular marker. The depletion, because of its aspecificity, also does not allow the distinction of mesenchymal cell subpopulations belonging to the same family, and it isn't able to distinguish possible differences between populations from different sources or between sub-populations from the same source.

Mesenchymal stem cells are also sorted through gene selection processes (Gene Transfer Technology, GTT) which are laborious and expensive in terms of cost and time of execution, require highly specialized personnel and the genetic modification of cells.

However existing technologies are the representation of the two antipodes of cell selection: extremely specific that means low cell recovery, or nonspecific that means absence of cell characterization.

About fractionation and selection of biological material, the problem of selection/enrichment still remains unsolved because of the cell manipulation, the lack of assurance about the composition for cell populations isolated by depletion techniques, the impossibility to separate complex or raw samples composed by several populations. The separation/enrichment of biological material growing in adherent conditions is even more problematic, such as a sample of multipotent stem cells—in particular human ones—which are for example mesenchymal cells, through a relatively simple method which doesn't involve the alteration of cells or their suffering, not too expensive and also operated by laboratory personnel with ordinary specialization. It is important to remind that the minimal manipulation is essential for the re-use of objects or particles for any application different from scientific research purposes.

Regarding rare populations such as stem cells and cancer cells, alternative technologies have been evaluated for the separation of cells from different tissues; in particular, methods of field-flow fractionation (FFF below abbreviation of Field-Flow Fractionation) have been evaluated, which are able to distinguish different cell populations, and related sub-populations, basing only on physical differences, including morphology and peculiar biophysical properties of the analyte within complex populations (Reschiglian et al., TRENDS in Biotechnology Vol. 23 No. 9 Sep. 2005). Thanks to these technologies it becomes possible to simplify the sample and obtain the target cells remaining in the standards of minimal manipulation.

These technologies and methodologies consist in procedures which maintain the processed cell sample unchanged respect to the starting sample and not add auxiliary properties or remove native properties. We are referring to the techniques FFF (field-flow fractionation), Gr-FFF (Gravitational field-flow fractionation), Sd-FFF (Sedimentation field flow fractionation), FDF (Dielectrophoresis FFF), centrifuges and similars.

Comparable separation techniques in dynamic fluidic conditions, and in particular those belonging to FFF, provide methods for the fractionation of cell fractions prepared adding living cells in suspension in physiological saline buffer. The sample is then introduced inside the fractionation device. The introduction and separation can take place both with continuous flows and an injection system comprising syringes through which the sample can be introduced into a capillary channel for the fractionation.

The sample is then separated or fractionated by the device or observed for research studies regarding the behavior of single particles or groups of particles isolated from the initial sample. The separation can be operated in static or dynamic conditions. In the dynamic case a continuous flow is pumped and a mechanism of elution from the device is performed, in presence or absence of contact with the device itself; in the static case, cells are held in specific locations to observe the response to the condition changes imposed by modification in the terms of conditions and composition of the fluid in which cell live. The method of dynamic separation can prevent the immobilization of the objects to be analyzed/separated on the device physical components avoiding the contact with it. The fractions, containing the different cell types in different populations separated during the crossing through the fractionator device, are then collected. Alternatively, the cell sample is wasted once the study is completed or for reasons of cell aging and viability.

Some methods belonging to the field-flow fractionation techniques are used for the separation of biological samples, from bacterial populations to epithelial cells, but the results achieved with the implementation of methods and devices public from the prior art show several disadvantages. Techniques that operate in dynamic flow separation conditions thanks to the Earth's gravitational field are in particular evidence, since they are the most simple and less expensive techniques among the others available for separation purposes.

These techniques use a fractionation device of which a detail is described in FIG. 14. An element of fractionation 1100 comprises a channel 1122 in which can be introduced, through an injection port 1102, a longitudinal flow (pointed out by the arrow) in the direction of the flow inside the fractionator device. The device is generally subjected to a field of force, for example the gravity force, which acts perpendicularly respect to the flow direction.

In the channel 1122 the transversal flow rate profile of the transport fluid of objects (mobile phase) inside of the device is parabolic, thanks to the laminar flow. The same for the profile of the longitudinal flow rate. Therefore the cells injected into the fractionation device run with the same flow profile of the elution fluid. This inevitably involves an immobilization of the cells that are in proximity of the side walls of the fractionation device, according to the decreasing of the velocity of the flow in proximity of the side walls that leads towards to zero and is zero on the surface of the side walls. This means the cellular sample loss thanks to the immobilization of cells, which have a velocity equal to zero, and deposit at the walls of the fractionation channel. The sample loss is evident for the fractionation of adherent stem cells, which are predisposed to adhere to solid supports such as the walls of the device.

The aim of the present invention is to provide a device for the fractionation and the isolation in dynamic conditions that overcomes problems regarding the maintenance of efficacy, easy-to-use and cheapness respect to the existing instrumental technologies and, at the same time, able to minimize the lacks in terms of immobilization, cell recovery, viability and sample manipulation. In other words, a purpose of the present invention is to provide a device which allows to overcome, or at least to reduce, the immobilization of objects to separate on the fractionation channel walls, ensuring an improvement of the eluted material recovery. This device belongs to the devices for high recovery cell separation and/or isolation of populations or sub-populations highly pure, abiding by the category of minimal manipulation techniques that involves the admittance to "scale up" clinical/medical-surgical device.

Another purpose of the present invention is to provide a method for the fractionation of objects in a dispersing fluid in fluid-dynamic conditions, allowing the collection of eluted objects fractions in different containers, thus isolating the fractions which contain target objects and avoiding the risk to lose cellular material injected into the device.

SUMMARY OF THE INVENTION

The subject of the present invention is solved by the different embodiments. Advantageous embodiments of the present invention are additionally disclosed.

In particular, the present invention relates to a device for dynamic fractionation of a dispersed phase in a dispersing fluid. The dispersed phase may comprise objects and particles or groups of particles, preferably microscopic sized as cells, molecules, particles and similar. The device consists in a fractionation channel and in a series of injection ports, from a first to a third. Through the first injection port a first confining fluid can be injected in the channel, while through the second injection port a second confining fluid can be injected in the channel. An elution fluid for the transport of the dispersed phase can be injected in the channel through the third injection port. The third injection port is arranged between the first and the second injection ports. A first portion of the fractionation channel includes a first to third terminal portions in correspondence to a first to third injection ports respectively. Wherein the first to third terminal portions (241, 251) are dimensioned such that the first and second confining fluids respectively have a first and second predefined flow rate and the elution fluid can have a third predefined flow rate, the third predefined flow rate being larger than the first and second flow rates so as to confine the elution fluid between the first and second confining fluid. The fluid introduced in the fractionation channel through the first to third ports is defined mobile phase in the fractionation channel.

Advantageously, the portions first to third may have a geometry which allows the introduction of the fluid through the respective port developing a laminar flow which flows parallel to the longitudinal axis of the channel. For example, the end portions may have an arch or a cusp or V-shaped profile. Alternatively, the end portions 1 to 3 can be polygonal shaped. The first to third injection ports can be placed in proximity of the terminal portions, respectively, where the end portion corresponding to the injection port of the elution fluid is wider than the terminal portions corresponding to injection ports of the first and second confining fluid which advantageously may be the same as each other.

A further object of the present invention is a method for the fractionation of objects in a dispersing fluid, which includes the injection in a fractionation channel of a first confining fluid through a first injection port and a second confining fluid through a second injection port. The first and second confining fluids are respectively supplied to a first and a second predefined flow rate. The method also includes the injection of an elution fluid for the supply of a mobile phase through a third injection port arranged between the first and the second injection port. The elution fluid has a third predefined flow rate which is larger than the first and second predefined flow rates so as to confine the elution fluid between the first and second confining fluid.

Advantageously, the first and second predefined flow rates of the first and second confining fluid can be in the range from 5% to 25% of the third predefined flow rate of the elution fluid, preferably 10% of the third predefined flow rate.

Further advantages and characteristics of the fractionation method and device, according to the present invention, will be pointed out in the following detailed description of some executive structures, described as example and not limitative, referring to the associated drawings, in which:

Figure 1:
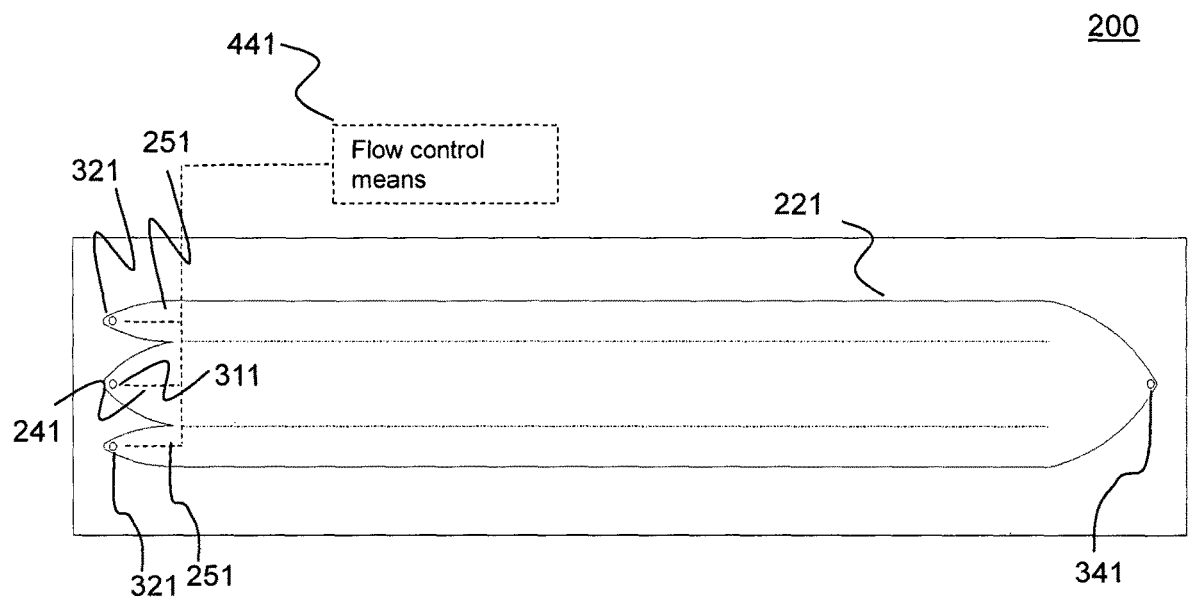
FIG. 1 shows a top view of a detail of the fractionation device according to one embodiment or executive figures of the present invention.

The following paragraphs describe various representative embodiments of the present invention. For example, to facilitate the understanding, the fractionation device according to the present invention will be described referring to the fractionation of biological material, in particular cells. It has to be noted that the solutions described referring to the different following embodiments can also be used for the analysis and separation of different kind of samples, such as for example organic and inorganic particles of appropriate size, comprised between a few micrometers and a few hundreds of micrometers, such as polymeric particles, globular or lamellar mineral particles, carbon particles, silica particles, particles for drug delivery, blood serum and suspended cells, bacterial populations, liposomal vesicles.

The term fractionation channel is used in the description and in the claims to indicate a recess obtained in an fractionation element of the device according to the present invention inside of which a fluid can flow through, from an injection point arranged in correspondence of a first end of the fractionation element to an extraction point located in correspondence of a second end of the fractionation element, opposite to the first end. The fractionation channel can be a capillary channel.

The term capillary is used to indicate a channel whose dimensions, in at least one dimension, allow the generation of laminar flows inside the fractionation channel. A capillary fractionation channel can present the length and width which not meet the definition of capillarity, while the thickness which meet this definition, to obtain a laminar flow.

The term fractionation channel means a capillary channel in which at least one dimension meats the definition in the previous paragraph.

The term lateral band indicates a portion of the fractionation channel adjacent to the lateral wall of the channel, which is extended along the side walls throughout the length of the channel, and which has a dimension perpendicular to the side wall of the channel, from here indicated with the term of width, not equal to zero.

The term object refers to the dispersed phase that is subjected to separative process, then a particle or a cluster of small sized organic or inorganic particles, preferably microscopic, such as polymeric particles, globular or lamellar minerals, coal particles, silica particles, particles for drug delivery, blood particles and cells in suspension, bacterial populations, liposomal vesicles.

The term dispersed phase refers to an element in a physical state different than the physical state of a dispersing phase. The dispersing phase is an element wherein the dispersed phase is homogeneously distributed but not miscible. For example, in case of particles or cells the dispersed phase, or cells dispersions, may be solid particles dispersion (solid phase) homogeneously disperse into a liquid (dispersing liquid). In this case it may be called solid/liquid dispersion because the two phases are in a different physical state and not miscible (solid and liquid).

The present invention is based on the observation that fractionation devices known at the state of the art, and which use the principle of the Field-Flow fractionation have the disadvantage that a not negligible fraction of the sample to be analyzed or to be separated adheres to the fractionation channel walls. The methods of microscopic material separation by conventional fractionation devices, it may be lost about 40% of the sample. This is due to the fact that into the fractionation channel an elution fluid wherein the sample is injected has a laminar flow and the flow velocity profile is parabolic, where maximum velocity is in the center of the channel and null near at the lateral walls of the channel. All the objects into the elution fluid have a null velocity near the walls of the channel and tend to adhere to the lateral walls of the channel. Another problem of some devices known at the state of the art is that the sample is injected into the channel when the mobile phase flow is stopped or, in other words without the mobile phase flow, which is started again just after the sample injection. Also in this case a sample fraction injected into the channel adheres to the channel bottom wall and it is not carried towards the outlet that is the sample collection port. Moreover the fact that the objects near the lateral walls of the channel are in suspension into an elution fluid portion with null velocity, allows the contact of these objects to the lateral walls, causing in this way their lost and consequently reducing the efficiency of the fractionation device. This problem is evident if objects to separate comprise silica particles, polymeric particles, or biological material, such as for example bacterial populations, cells and in particular epithelial cells or adherent stem cells, those adhere more easily to the walls.

The device according to the present invention is based on the acknowledgment that the flow profile of the elution fluid in a perpendicular direction to the longitudinal axis of the fractionation channel has a not negligible role for the final performance of the device. In this case the longitudinal axis of the channel is identified such as the axis which extends all along one direction from the injection port to the collection port of the channel. In particular, the present invention is based on the observation that the optimal elution flow into the separation channel may advantageously have, in the ideal case, essentially a step or square wave profile. Practically an elution flow profile that presents a not null front in the center oriented perpendicularly to the longitudinal axis of the channel and null at the lateral band of the fractionation channel near to the lateral walls, causes a reduction of the sample adhesion to the lateral walls of the channel ensuring in this way an important increase of the efficiency of the device. Preferably the width of a lateral band is in the range from 10% and 25% of the total width of the channel.

Figure 11:
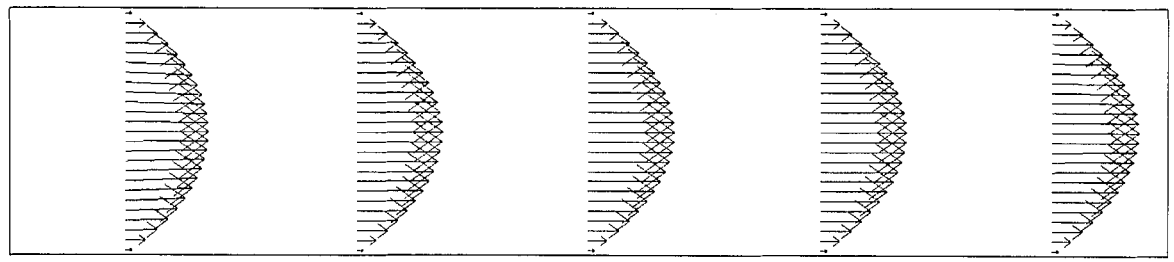
FIGS. 11(A) and (B) represent the trend of the total velocity vector field the transport fluid (mobile phase) in the fractionation device according to the present invention (11(B)) for comparison with the trend of the velocity in the device at the state of the art (11(A))
Figure 11:
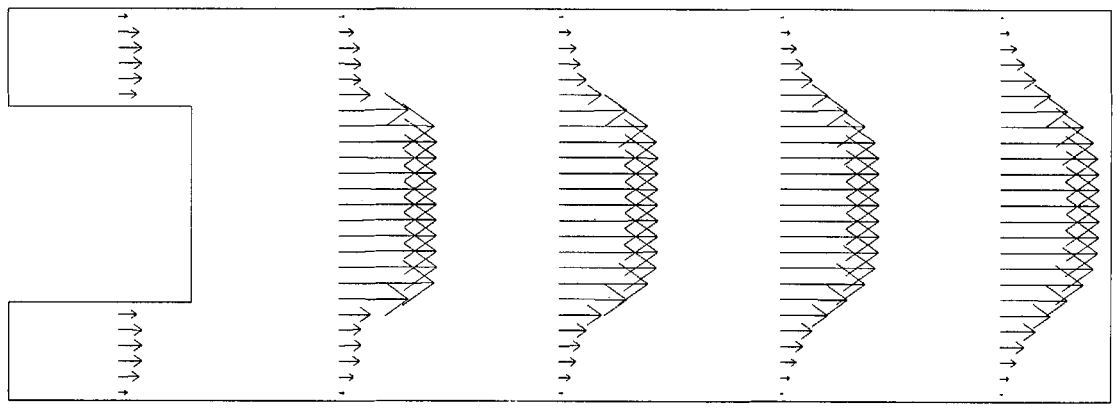

A particular of the fractionation device which allows an elution fluid flow as described above according to the present invention is shown in FIG. 1. The fluids velocity trend into the channel 221 is shown in FIG. 11(B).

In particular, FIG. 1 shows the plan view of a fractionation element 200 from which is obtained a fractionation channel 221. The fractionation element 200, which execution will be described referring to the description of the execution form shown in FIG. 2, comprises a first and a second fluid injection port 321. The first and the second injection port will be named below also with the term first and second lateral port. Through the first injection port 321 it is possible to inject into the channel a first confining fluid, meanwhile through the second injection port 321 it is possible to inject into the channel a second confining fluid. An elution fluid for the alimentation of the mobile phase may be injected into the channel 221 by a third injection port 311, named below also central port. The third injection port 311 is arranged between the first and the second injection port 321. A first end portion of the channel 221 comprises a first to a third terminal portion 241, 251 respectively arranged in correspondence to the first to the third injection port 321, 311. The terminal portions from the first to the third are configured and they have a geometry such as to cause into the fractionation channel 221 three different flows. In particular the first and the second confining fluid make respectively two lateral flows, which may have respectively a first and a second predefined flow rate. The elution fluid injected through the third injection port defines a central flow, which may have a third predefined flow rate.

The third predefined flow rate is higher than the first and the second predefined flow rate such that confine the elution fluid between the first and the second confining fluid. Moreover the preference to create confining flows having a flow rate lower than the flow rate of the elution fluid allows a central flow having a width that consent to perform the sample field-flow fractionation avoiding the contact of a part of the sample with the lateral walls of the fractionation channel. The selection of the channel geometry, and in particular of the terminal portions 241, 251 allows to apply in an efficient way a field-flow fractionation method. A choice of the geometry and of the position of the terminal portions 241, 251 such as to generate an elution fluid flow focused in a few micrometers band and in particular less than 100 micrometers, for example, all along the longitudinal axis of the fractionation channel wouldn't allow the material separation of the sample.

The flows injected through the first and the second injection port act as confining element or as fluidic guide of the sample during the injection step and during the separation process. This configuration prevents the cellular loss and the band broadening of the elution flow that causes a separation efficiency decrease. Advantageously the first and the second confining flow may be parallel to each other and to the elution fluid flow or central flow. In order to obtain that the fluidic guide, the terminal portions from first to third 241, 251 may be configured and arranged such that their respective longitudinal axes are parallel to each other and parallel to the longitudinal axis of the fractionation channel 221. This configuration allows to generate easily and accurately laminar flows parallel to each other so that the elution fluid flows in the center of the channel in parallel to the flow of the first and the second confining fluid.

In an advantageous form of the present invention, the base of the third terminal portion 241, called below also with the term central terminal, portion, in correspondence to the third injection port 311 is larger than the base of the first and the second terminal portion 251 (called below also with the term first and second lateral terminal portion), which are respectively arranged in correspondence to the first and the second injection port 321. In the configuration of the fractionation channel 221 according to the present invention, the base of the terminal portion is a part of each terminal portions 241, 251 that is connected to the fractionation channel 221. The part of the terminal portions 241, 251 opposite to the base will be conventionally called below with the term point terminal portion.

In another development of the configuration described above, the base width of the first and the second terminal portion may have a value until 50% of the base width of the third terminal portion. The base width of the first and the second terminal portion 251 may be chosen to ensure that the central flow is in a predefined distance not null from the lateral walls of the fractionation channel 221, for example in the range from 25% to 50% of the base width of the third terminal portion.

In an illustrative realization of the present invention, the lateral flows may have a flow rate of 0.1 ml/min and may be parallel to the central flow which may have a flow rate of 1 ml/min. More generally geometry and dimension of the third terminal portion 241 may be chosen in order to obtain an elution fluid flow (central channel) of a width such as to obtain a distribution of cells sample all along the width of the fractionation channel 221 equal to almost the half of the total width of the channel 221. The first and the second terminal portion 251 may have a geometry and a shape such as to generate at the central channel sides of the lateral channels with a width in the range from 10% to 25% of the total width of the channel 221. The lateral channels are generated by the flows of the first and the second confining fluid. In this way the central channel is arranged in a predefined distance, which corresponds to a value in the range from 10% to 25% of the total width of the channel 221, from the lateral walls of the fractionation channel 221.

Terminal portions wherein the first to third 241, 251 may be advantageously arch-shaped. According to the present invention the term "arch-shaped" is general. Consequently the terminal portions may have any profile amenable to the arch-shaped one. These profiles are, for example, cusp-shaped, V-shaped or U-shaped, or semicircular or polygonal ones.

Although the configuration described above, combined with the flow rates suggested, shows good results about cells separation and cell recovery, the dimension of central and lateral channels, and the confining fluids and elution fluids flow rate may have different values than those indicated above. These values depend on the utilize of the fractionation device and on the nature of the sample injected into the device. In applications for separation of biological material, central flow rates can be chosen in the range from 0.5 to 3 milliliters per minute and, reasonably, increase with the dimensions of the fractionation device, which can be in the range from 4 to 6 centimeters of width, from 20 to 40 centimeters of length, from 0.1 to 0.7 millimeters of thickness. Moreover the terminal portions 241, 251 can have different profiles from those decrypted above. For example the terminal portions 241, 251 may have a polygonal profile without mean a different idea of this invention.

According to the configuration described in FIG. 1, the sample may be injected into the fractionation channel through the third injection port, before injecting the elution fluid into the fractionation channel 221. In this case the sample lays down on the bottom surface of the fractionation channel 221 and it is eluted by the elution fluid all along the fractionation channel 221.

Fractionation device 200 described in FIG. 1 is not limited to the method concerning the sample injection described above. Advantageously fractionation device 200 may comprise a sample injection port realized by a septum (not shown in FIG. 1) for the injection of a sample that is a suspension of objects into a fluid which have to be fractionationed by the fractionation channel 221. The sample injection port is arranged in order to allow, for example, the injection of the objects into the flow of the elution fluid perpendicularly to the plane of the fractionation channel 221. More generally the sample injection port is arranged in order to inject a sample by a flow in the plane of the fractionation channel. In an execution form according to the present invention, the septum may be arranged aligned with the third injection port 311, advantageously in the center of the central channel defined by the flow of the elution fluid.

By the injection through septum the sample is injected into the elution fluid in motion, in this manner the objects injected into the channel 221 don't adhere to the bottom surface of the channel 221. Thanks to the confining fluids, which flow in parallel to the elution fluid, the objects injected, which expand into the fractionation channel 221 for its whole length, are confined into the central channel by the lateral fluids, so that the objects injected into the channel 221 don't adhere to the lateral walls of the fractionation channel 221.

The fractionation device according to the present invention further comprising at least one stream control means 441, that is in fluidic connection with the first to third injection ports 311, 321. The stream control means 441 allows to control the flow of the elution fluid injected by the third injection port 311 adapted to have a third predefined flow rate. The stream control means are further in fluidic connection with the first and the second injection port 321 adapted to control a flow of the first and e second confining fluids injected into the fractionation channel 211 through the first and the second injection port 321 respectively. The stream control means 441 allow to control the flow of the first and second confining fluid adapted to have a first and a second predefined flow rate, wherein the first and the second predefined flow rate are lower than the third predefined flow rate. In the case reported in the present invention the first and the second predefined flow rates have the same value. Alternatively, the first and the second predefined flow rate can have different values.

In a particular production form according to the present invention the stream control means 441 comprises one pumping system (not shown), for example a peristaltic pump, a syringe pump, a membrane pump, a HPLC pump and similar, that elutes the elution ports 311, 321 through separation fluidic channels. In this case every predefined flow rate from the first to third can be controlled by the respective valve arranged into the fluidic device between the pump and its respective elution port. Pumps list above is only an example and it is not restricting. In particular every pump that controls the flow of a fluid into a fractionation channel according to the present invention may be used with the same effectiveness of the pumps listed above.

In a different production according to the present invention, the stream control means 441 comprises a first and a second pump (not shown) in fluidic connection with the first and the second injection port 321 and a third pump (not shown) in fluidic connection with the third injection port 311. In this case pumps from first to third may be independently controlled in order to generate the first and the second confining fluid having the first and the second predefined flow rate respectively and the elution fluid having the third predefined flow rate.

Obviously a person skilled in the art may consider other configurations of the stream control means. For example, in case the first and the second confining fluid have the same flow rates, if the first and the second injection flow rate have the same values, the stream control means may include a first pump adapted to feed the first and the second confining fluid, and a second pump adapted to feed the elution fluid. According to this different configuration design and production form of fractionation device is easier and cheaper.

Figure 2:
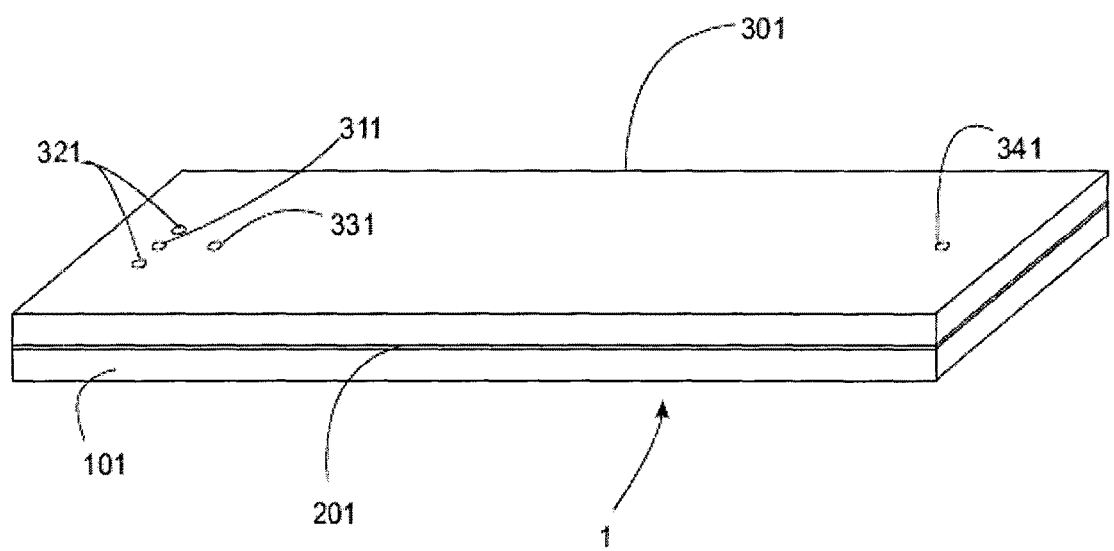
FIG. 2 shows a detail of the fractionation device according to the present invention.

In FIG. 2 a detail of the fractionation device is shown according to a production form of the present invention that is a production of the concepts expressed referring to FIG. 1.

An advantageous executive form of the fractionation device 200 comprises at least three layer of plastic material, including: at least one bottom layer 101, adapted to be the accumulation wall of the fractionation device, and eventually provided of the collection port of the eluted fractions; one middle layer, adapted to fix the lateral walls contour of the capillary channel; and one top layer 301, wherein the injection ports of the mobile phase and the cellular sample are arranged, and eventually the collection port of the eluted fractions.

The plastic material layers are matched each other in a removable or permanent way; materials whereby the layers are made consider both the possibility of a repeated use of the device, and the possibility of use as a disposable. A fractionation device 200 comprises the channel 221. The channel comprises in turn the bottom layer or accumulation wall 101. The accumulation wall may be made of plastic material, as for example polyvinylchloride, polycarbonate, polyester, polystyrene or polymethylmethacrylate. Alternately, the accumulation wall 101 can be made of inorganic material, as glass. Glass is more polar than plastic materials, so this material may be advantageously used in case the device is used to separate plastic particles, such as for example polystyrene. This bottom layer is the accumulation wall of this type of fractionation devices. The bottom layer 101 may have a thickness in the range from 5 to 15 mm, and preferably it is a 10 mm thick. Clearly these are not restricting values and it is clear that a person skilled in the art may choose a bottom layer with a thickness different from that indicated according to the design requirement and to the use of the fractionation device.

The fractionation device 200 comprises the top layer or the supplying wall 301, wherein the third injection port is arranged or central injection port 311 of mobile phase of the fractionation channel, the first and the second injection port or lateral injection ports 321 of mobile phase. FIG. 2 shows a production form of the fractionation device described according to FIG. 1 comprising the sample injection port 331.

The fractionation device 200 further comprising one collection port 341 for the eluted fractions collection. The top layer 301 has substantially the same characteristics of the bottom layer 101; it consists of a plate with a thickness in the range from 5 to 15 mm, preferably 10 mm. The supplying wall 301 may be made of plastic material, such as polyvinylchloride or polycarbonate. Alternately, the accumulation wall may be made of polyvinylchloride, polycarbonate, polyester, polystyrene, polymethylmethacrylate and similar. Ports arranged on the top layer 301 have a section in the order of 5 mm, but this section is changing and it depends on the junctions section with injection channels, injection channels and collection channels, here not shown, because they are not the subject of the present, invention. Similarly to the accumulation wall 101, thickness and diameter values indicated above are not restricting and it is clear that a person skilled in the art can choose a different supplying wall thickness and injection ports with diameter different from that indicated according to the design requirement and to the use of the fractionation device.

Figure 3:
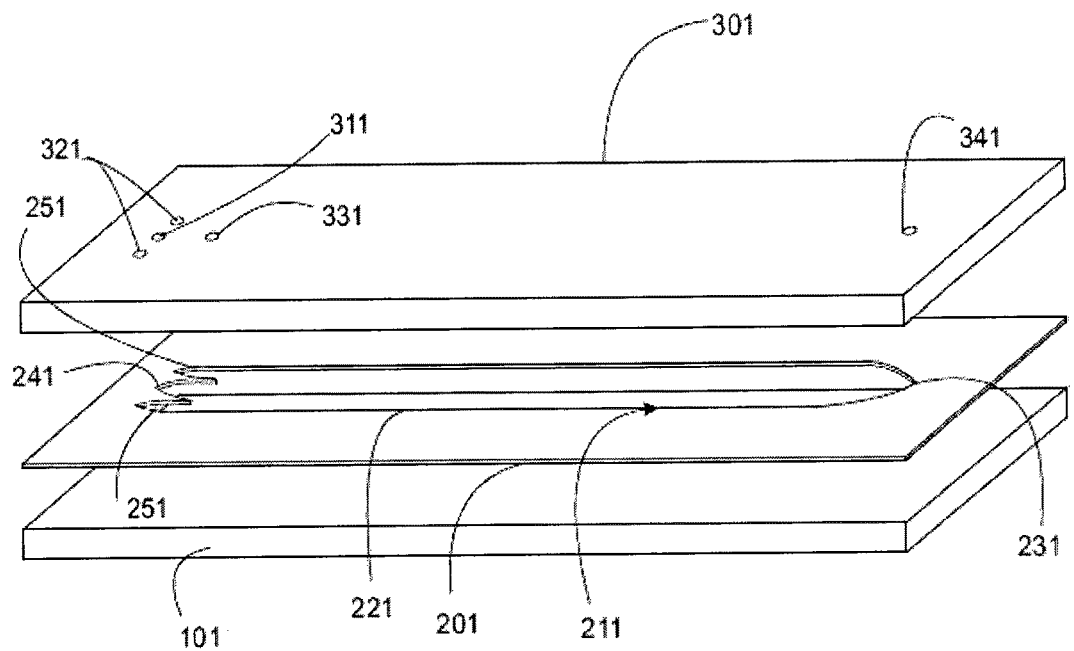
FIG. 3 shows the device of FIG. 2, in an exploded configuration.

Between the accumulation wall 101 and the supplying wall there is one middle layer 201, which fixes the perimeter profile of the fractionation channel 221. The profile of the capillary channel can be obtained into the middle layer by an appropriate manufacture. The middle layer 201 and the capillary channel 221 may be looked at the exploded view drawing in FIG. 3. The middle layer 201 is made by plastic material, such as for example polyethylene terephthalate, and it has a thickness in the range from 0.2 mm to 0.5 mm, preferably 0.25 mm. The perimeter profile of the fractionation channel 211 comprises longitudinal walls, an ogive 231 arranged in correspondence to the collection port 341, and three terminal portions 241, 251 respectively corresponding to the injection ports or central and lateral injection ports 311, 321. In the production forms described in this document the terminal portions are arch-shaped. The first and the second terminal portions 251 will be also indicated by the term lateral terminal portions, meanwhile the third terminal portions 241 will be indicated by the term central terminal portion. The central injection port 311 and the lateral injection port 321 of the capillary channel lead-to the terminal portions 241, 251.

Figure 4:
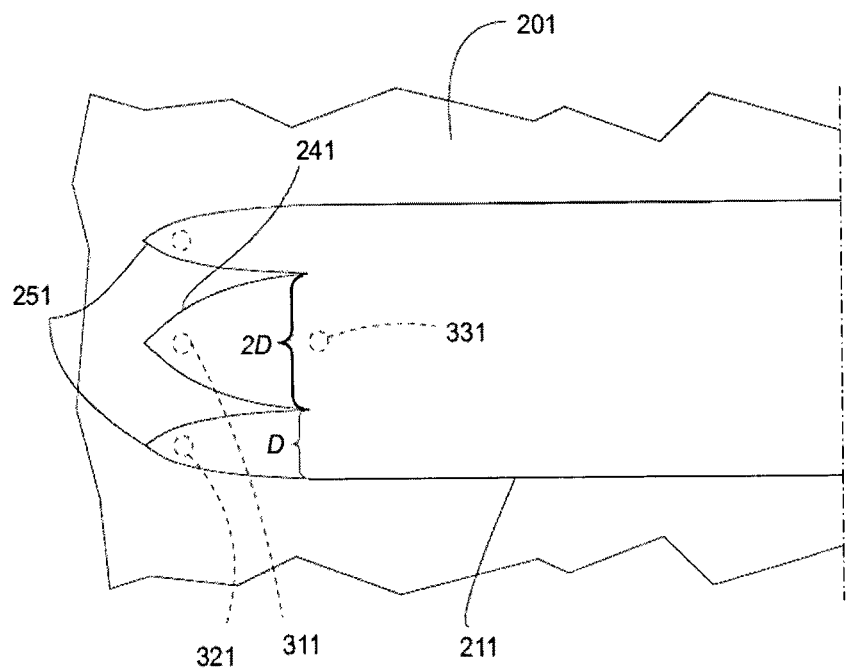
FIG. 4 is a plan top view of a component of the device of FIGS. 1 to 3.

FIG. 4 is a top plan view of a component of the device of FIGS. from 1 to 3. In particular, FIG. 4 shows the plan view of a portion of the middle layer 201. In the particular implementation described in FIG. 4, the central terminal portion that corresponds to the third terminal portion 241 is, at its base, 2D width that is substantially the double width D of the lateral terminal portions 241. In the figure the injection ports of the mobile phase 311 e 321 and the injection port 331 are represented by a dash and dot line. The injection port 331 is arranged in the same longitudinal axes of the central injection port 311 and immediately below the baseline of said terminal portions. In particular, the injection port 331 may be advantageously arranged at the point of the channel where the central flow and the lateral flows line up and are stables. The terminal portions 241, 251 are also oriented such that their longitudinal axis, which extends from the external tip to the middle of the baseline of every terminal portions, are parallel to the longitudinal axis of the fractionation channel 221 and more generally to the fractionation device 200. This geometry allows parallel laminar flows. Moreover, the flows generated by injecting the first and the second confining fluid into the first and the second injection port 321, respectively in correspondence to the first and the second terminal portion 251, have a injection flow rate lower than the injection flow rate of the elution fluid injected through the third injection port 311 into the third terminal portion 241 as well as into the fractionation channel 221. In this way the elution fluid flows into a central channel, which is confined between the first and the second confining fluid and it has a width such that allows the correct sample separation.

Figure 5:
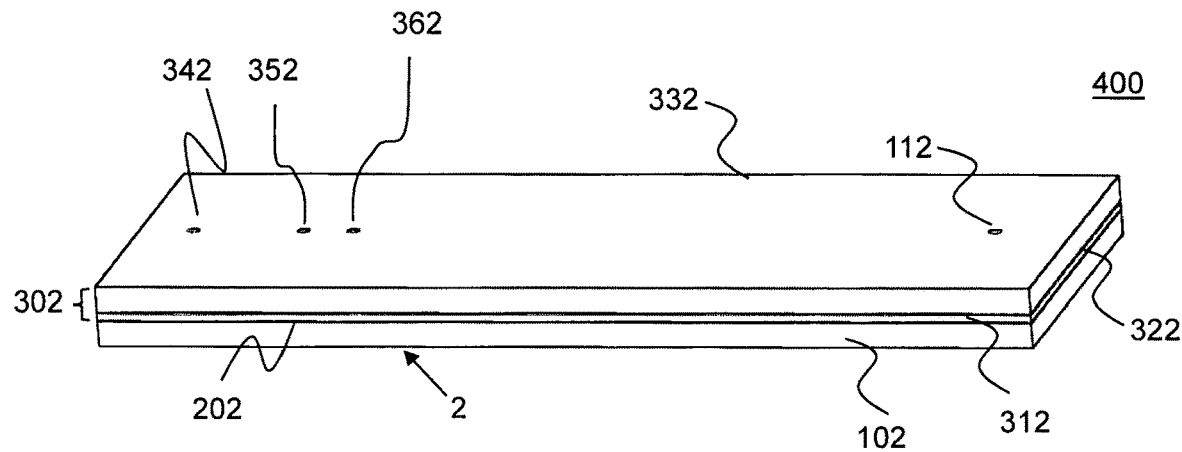
FIG. 5 is a perspective view of a detail of the device according to a second embodiment of the present invention.

In FIG. 5 is shown a second production form of the fractionation device according to the present invention that provides the presence of a plurality of fractionation channels 212, 222 which are able to work in parallel independently. FIG. 5 shows a fractionation device 400 comprising two fractionation channels. It is in any case implied that the present invention is not limited to this configuration and that the fractionation device can also comprise more than two fractionation channels. For simplicity, the multiple channels configuration will be described in reference to a fractionation device having two fractionation channels 212, 222. The multiple fractionation device 400 comprises a bottom layer 102, a middle layer 202, wherein the perimeter profile of the two capillary channels are manufactured, they are shown in FIG. 5 and they will be better described below, and a top layer or injection wall 302. The top layer 302 is arranged on the middle layer 202 and it is divided into other three underlayers, respectively a first underlayer 312, in contact with the middle layer, a second underlayer 322, arranged on the first underlayer 312 and in contact with the latter, and a third underlayer 332, arranged on the second underlayer 322 and in contact with the latter; the third underlayer 332 includes a confining port to feed a confining fluid 342 and an elution port 352 to feed an elution fluid. The third underlayer comprises moreover a sample injection port 362 to inject a sample to be separated into the fractionation channels and a port 112 to the sample output collection. This configuration does not have to be considered restricting and it is implied that the input and output ports may be arranged in layers of the device different from those described above. For example, the port 112 for the sample output collection may be alternately arranged on the bottom layer 102.

Figure 6:
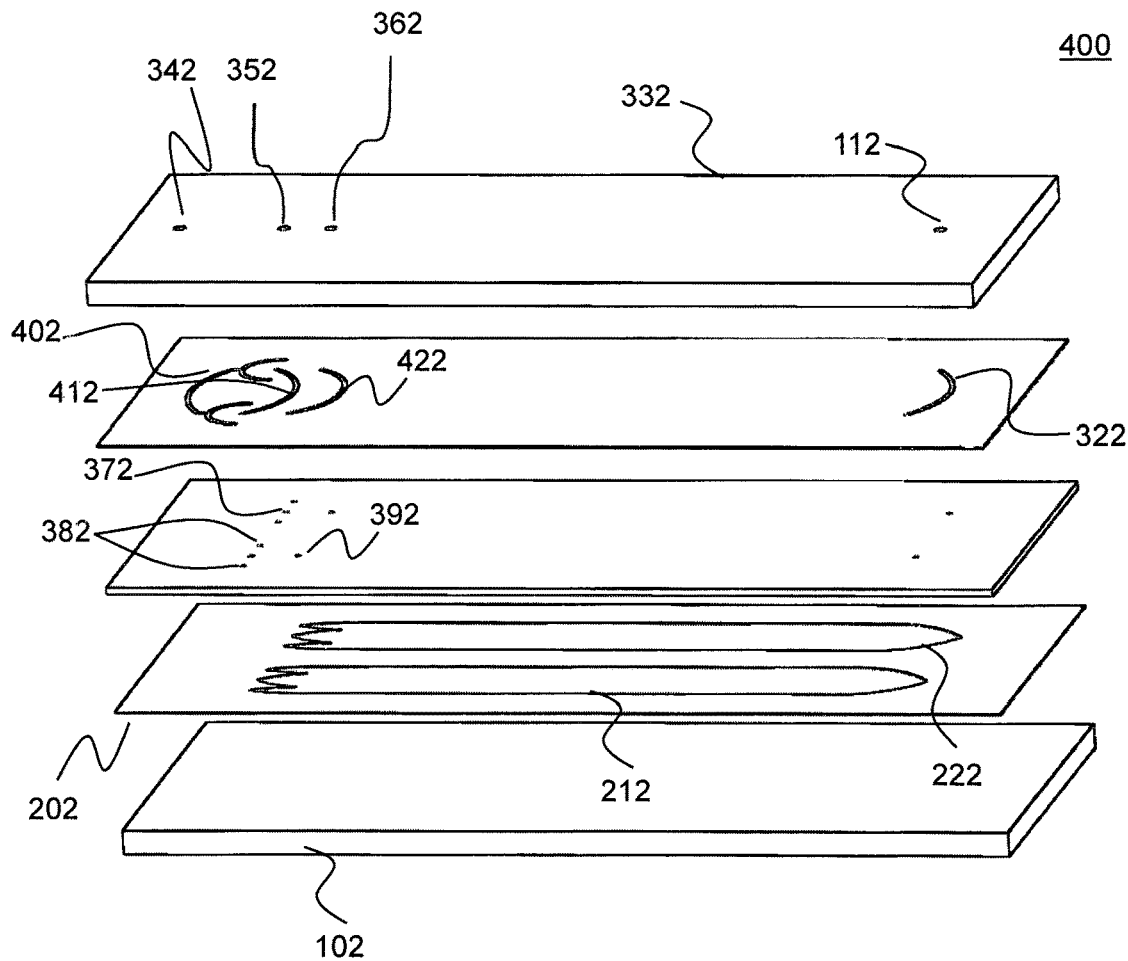
FIG. 6 is an exploded perspective of the device of FIG. 5.

In FIG. 6 the different layers and underlayers that form the multiple capillary channels 400 are shown by exploded perspective. The bottom layer 102 is made of plastic material, similarly to the bottom layer of the capillary channel 200 described before.

The middle layer 202 is a layer of plastic material, preferably with the same features of the middle layer described before for the capillary channel 200, wherein the perimeter profile of the two channels 212 e 222 are made and connected to a first end portion by a collecting duct 232. The fractionation channels 212 e 222 may have for example the same perimeter profile of the capillary channel 400 described before.

The top layer 302 comprises the underlayers previously mentioned; the first underlayer 312 includes one central injection port 372 for each fractionation channel for the elution fluid injection, two lateral injection ports 382 for each capillary channel, and the port 392 for the injection of the sample to elute, and the sample output ports. This underlayer is preferably made of polyvinylchloride, polycarbonate or polymethylmethacrylate, which has, for example, a thickness in the range from 1 mm to 5 mm, preferably a thickness of 3 mm.

The second underlayer 322 is made for example of PET or PETG or a material with similar properties, which has, for example, a thickness in the range from 0.2 mm to 0.7 mm, preferably of 0.5 mm. In this underlayer are manufactured the injection ducts 402 of the lateral injection ports 382 of the first underlayer 312, the injection duct 412 of the central injection ports 372, and the injection duct 422 of the sample injection ports 392, and the injection duct 232 of the port 112.

The third underlayer 332 is made of polyvinylchloride, polycarbonate or polymethylmethacrylate, and it may have a thickness in the range from 1 mm to 5 mm, preferably a thickness of 3 mm. In this underlayer are manufactured the top injection holes 342, 352, 362 and 112 as described before.

The operation of the fractionation device according to the present invention, and the method for the cellular material fractionation which implement it, become evident by the following description. As already explained, one of the disadvantages of the fractionation methods known from the state of the art is related to the longitudinal velocity of the transport fluid, which has a parabolic decrement from the center to the lateral walls. Another problem, partly related to this one, is that initially cells tend to be focused into the central portion of the channel, and subsequently they expand all along the front of the elution channel. Since the velocity of the cellular material transport fluid tends to zero near the lateral walls, cells may decelerate, worsening the fractionation efficiency and the cellular recovery. The present invention instead allows to the sample not to touch all the walls of the capillary channel making this device, completely respondent to the minimal manipulation regulations.

In order to improve the performance of the fractionation device, the method according to the present invention suggests to insert into the fractionation channel a mobile phase by almost two different and independent flow rates which are used to supply the fractionation channels 212 e 222 in order to have in each fractionation channel a central flow transporting the dispersed phase in correspondence to the longitudinal axis of the channel, and two lateral flows or confining flows in correspondence to the lateral walls of the fractionation channel. The first and the second lateral flows, which have a lower flow rate respect to the central flow, prevent the adherence on the lateral walls of part of the sample, as cells or biological material, and at the same time confine the eluted sample at the central channel for all the length of the fractionation channel. In a configurations of the fractionation device according to the present invention, the mobile phase flow rate of the channel central portion therefore the elution fluid, is in the range from 0.5 ml/min to 1.5 ml/min, preferably in the order of 0.8-1.0 ml/min; the flow rate of the first and the second confining flows at the lateral portions of the channel is in the range from 5% to 15% of the central portion flow rate, and preferably it is 10% of that flow rate.

The presence of the first and the second confining flows all along the lateral walls of the fractionation channel according to the present invention, modifies the functioning conditions related to the parabolic longitudinal velocity of the fractionation channel, developing "mobile" lateral walls into the fractionation channel.

Moreover, the sample destined to the fractionation is injected into the flow of the mobile phase through an injection port arranged immediately downstream of the mobile phase injection; this expedient allows a better confining of the injected cellular material.

The fractionation device has been tested according to the working steps of the method according to this invention; the preliminary tests have been done injecting glucose into the device. As can be observed from the charts of the FIGS. 7(A) (B), the results of FEM simulations, evidently show the different functioning of the two devices. In the charts the variation curves of the longitudinal velocity (7(A)) and of the total flow (7(B)) respectively in relation to the position on the front of the channel, than the width of the channel. For the simulations, the mobile phase flow rate at 1 ml/min and a total fractionation channel width of 40.0 mm, have been chosen for both the devices. These values are indicative and it's clear that channels with different dimensions and different flow rates are compatible with the present invention. More generally, the present invention is realizable using fractionation channels 221, 212, 222 which generate laminar flows and respect the ratio between the flow rate of lateral flows and the central flow described above.

Figure 7:
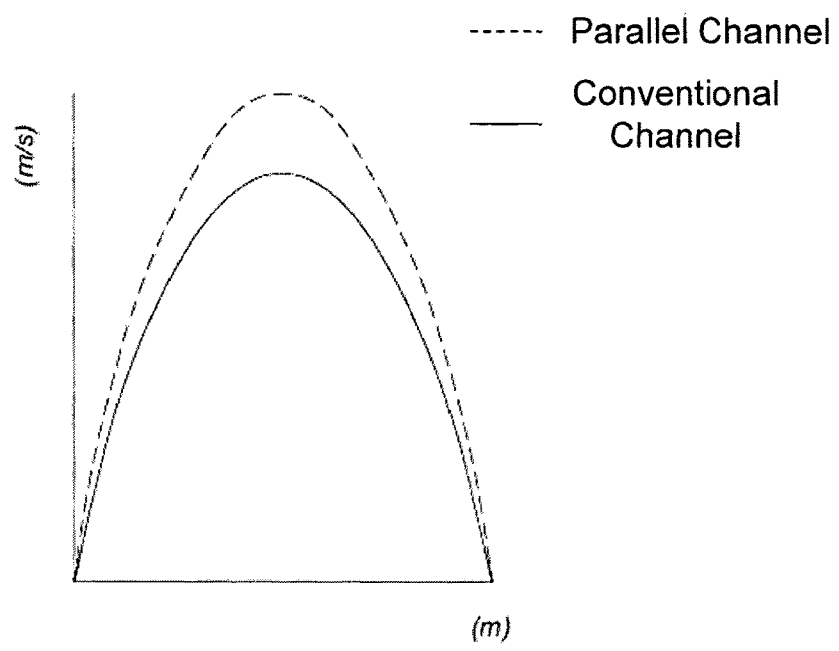
FIGS. 7(A) and (B) are graphs respectively representing the comparison between the profile of the velocity field of the fluid in the longitudinal direction and the longitudinal profile of the total flow in the device that implements the method according to the invention and the method of the state of the art.
Figure 7:
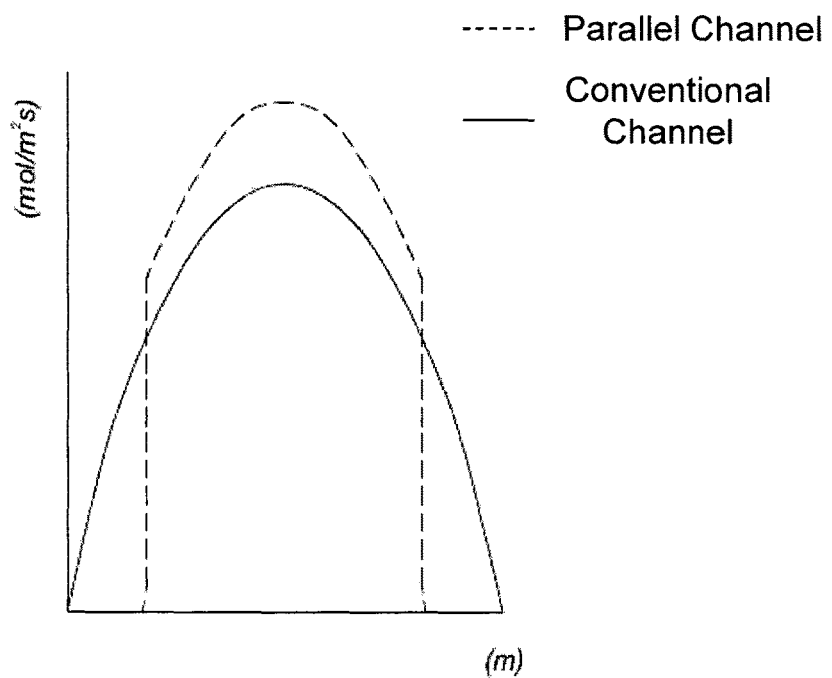

If the difference of the longitudinal velocity field profile (see FIG. 7(A)) is definitely relevant, as the different trends of the channel according to the invention (dashed line) and the state of art (continuous line), the variation of the total longitudinal flow profile (see FIG. 7(B)) is particularly significant. In fact the flow appears substantially reduced to zero in a predefined distance from the lateral walls, showing therefore a better ability to confine the sample to elute by the device according to the present invention.

Figure 8:
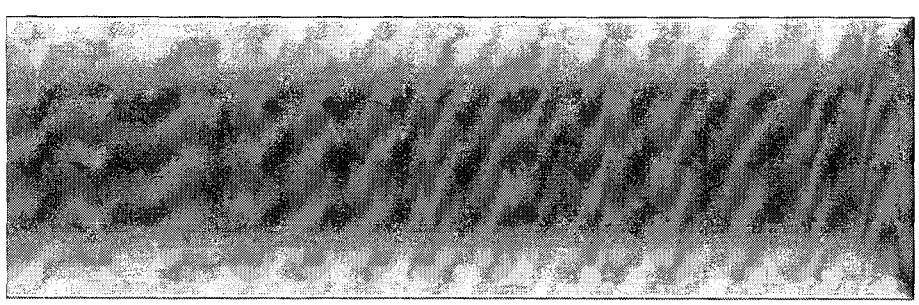
FIGS. 8(A) and (B) are diagrams, obtained by finite element method (FEM) simulation, which represent the surface trend of the total cell sample flow injected in the device according to the present invention and in comparison with the total sample flow in the device according the state of the art.
Figure 8:
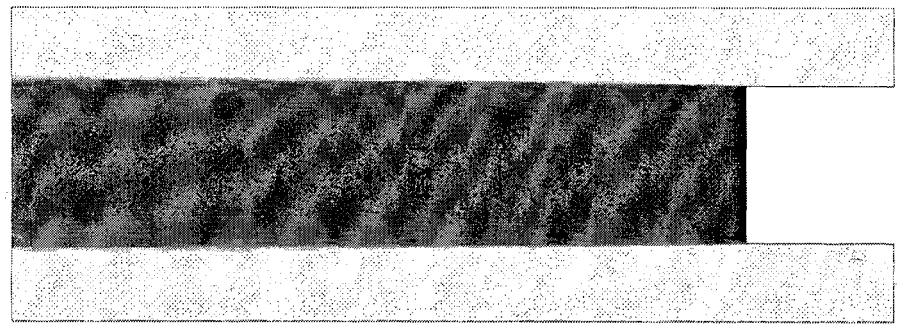
Figure 9:
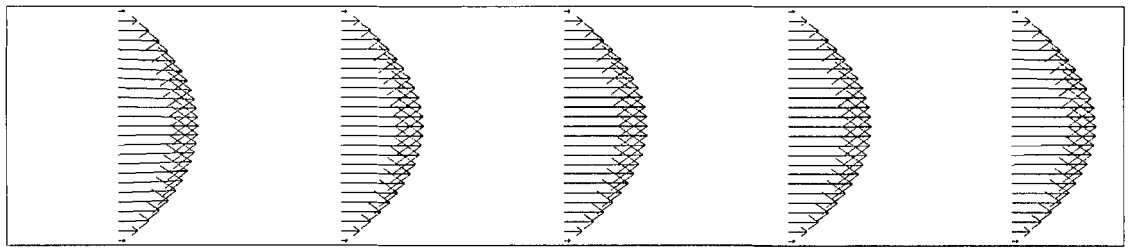
FIGS. 9(A) and (B) represent the vector representation of the trend of the total flow, obtained by FEM simulation, inside the fractionation device according to the present invention (9(B)) for comparison with the trend of the flow in the device according the state of the art (9(A))
Figure 9:
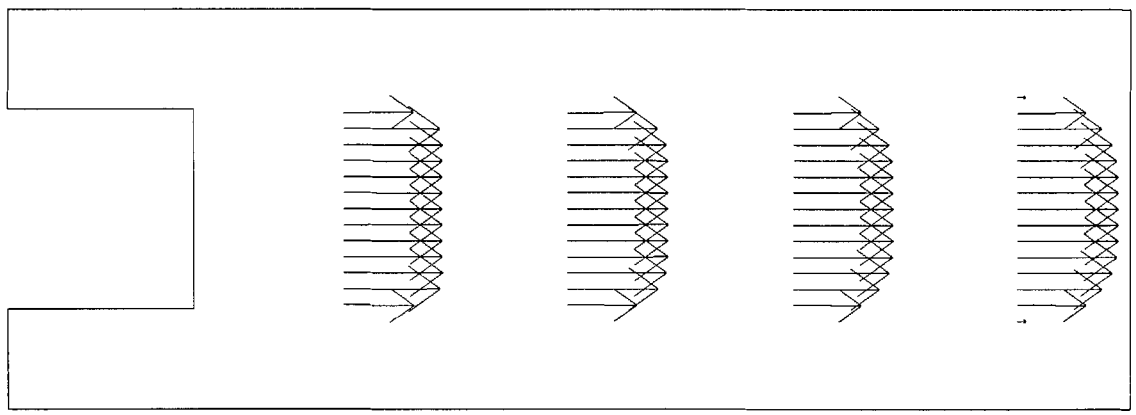

This result is validated by finite elements simulations (FEM) which give as result the trend of the surface flow and the velocity field of the injected cellular sample, calculated in the same conditions as before; these simulations show that the velocity field of the transport fluid and the total sample flow into the device according to the present invention, are definitely more pronounced, as reported in the dithering applied to the charts shown in the FIGS. from 8 to 11, more dense as the increase of the velocity field (10(A), (B)), and the total flow (8(A), (B)) respectively, confirming the higher focusing of the eluted sample. In particular, FIG. 8(A) shows the trend of the total flow in a conventional fractionation channel. This figure shows how the flow in a conventional fractionation channel extends to the lateral walls of the fractionation channel and carries a portion of the sample to, separate towards the channel lateral walls. FIG. 8(B) shows the total flow in a fractionation channel according to the present invention. From the total flow trend into the fractionation channel according to the present invention it is clearly demonstrated the focusing of the elution flow or central flow into the fractionation channel. The elution flow is confined in the center of the fractionation channel at a predefined distance from the lateral wall of the fractionation channel. Consequently the material of the injected sample by the central flow remains at a certain distance from the channel walls and in this way the adhesion of this material to the lateral walls is avoided. FIGS. 9(A) and 9(B) show the trend of the flow in vector form as described referring to FIGS. 8A and 8B.

Figure 10:
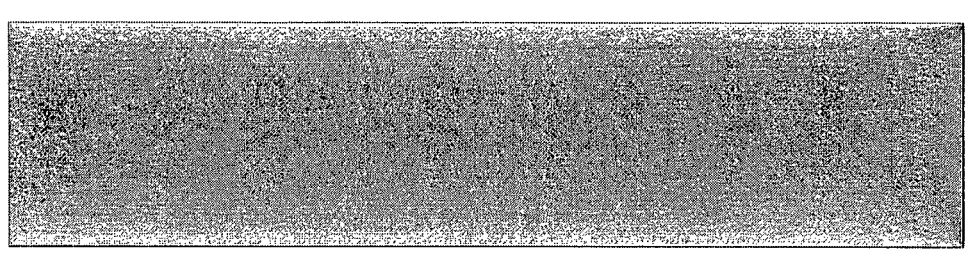
FIGS. 10(A) and (B) are diagrams that represent the trend of the total superficial velocity field of the transport fluid (mobile phase) in the fractionation device according to the present invention (10(B)) for comparison with the trend of the velocity in the device at the state of the art (10(A))
Figure 10:

FIG. 10(A) shows the trend of the flow velocity in a conventional fractionation channel. The trend of the transversal velocity all along a conventional channel is parabolic and the velocity is null near the lateral walls of the fractionation channel. FIG. 10(B) shows the trend of the velocity into the fractionation channel according to the present invention. The velocity profile in this case is essentially constant and flat in the center of the channel and less pronounced in the lateral channels. The transversal velocity field, which allows to separate material, instead remains parabolic and the velocity is null on the accumulation and injection walls. FIGS. 11(A) and 11(B) show the velocity trend in vector form as described referring to FIGS. 10(A) and 10(B).

Figure 12:
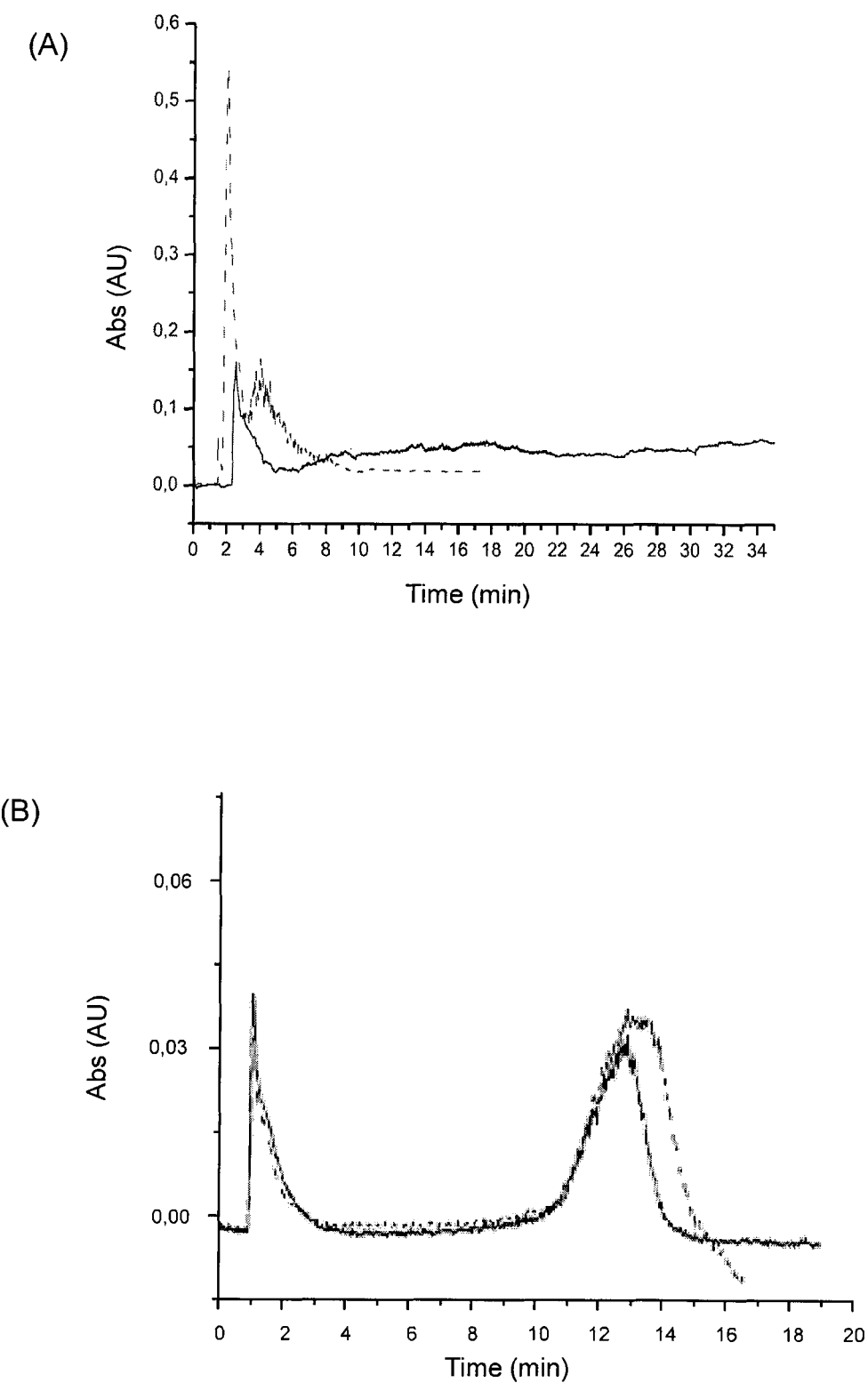
FIGS. 12(A) and (B) represent the detection graphs of eluted sample with a device known to the state of the art and with a device according to the present invention.

Several fractionation tests of different cellular material were performed; FIG. 12(A) shows the elution chart of two stem cells samples fractionated respectively by a fractionation device known from the state of the art (continuous line) and by the fractionation device and method according to the present invention (dashed line).

A mesenchymal stem cells from dental pulp (DP-MSC) sample was injected in both the devices; isotonic PBS+BSA 0.1% was used as mobile phase. The injected sample contained 300,000 cells in 100 µl. The chart shows the absorbance in function of time.

The experimental result underlines better separative properties and a higher cellular recovery using the device according to the present invention, in the conditions:
Same volume of the separative channel (4 cm with standard shape/4 cm with the fluid rail);
Same fluidic flow rate for the separation (0.8 ml/min as separation flow, excluding the flow rate of the fluidic guide);
Same sample injected.

FIG. 12(B) shows a similar experiment, wherein 50 µl of a whole blood sample is eluted by the fractionation device and method according to the state of the art (dashed line) and the fractionation device and method according to the present invention (continuous line) respectively; the mobile phase was saline solution and BSA 0.1%.

There is not any significant difference in recovery, efficiency and sensitivity for the species which a need "stop flow" step for the separation. The separative process is not affected by the adopted experimental conditions; conversely a better cohesion to the theoretical Gaussian of the retention peak corresponding to the retention volume of the red blood cells (HRBC) is observed.

Figure 13:
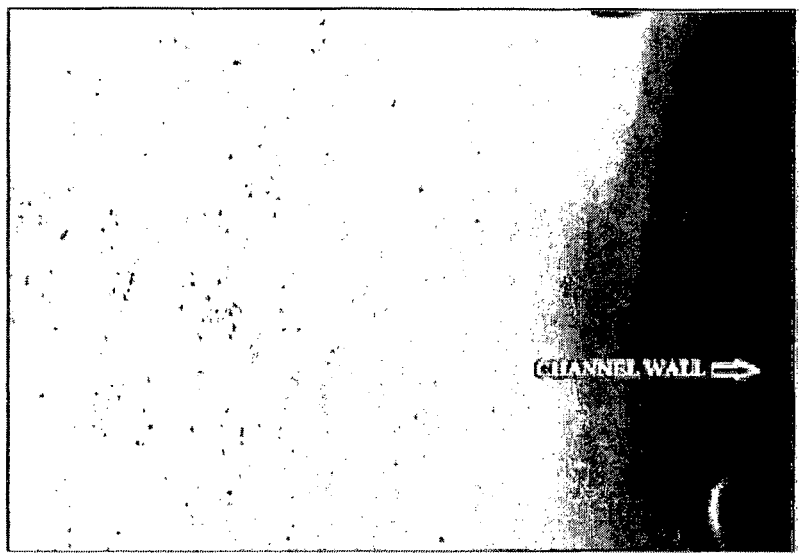
FIGS. 13(A) and (B) are photographs that represent the cell distribution close to the ends where is placed the collection port of the eluted fractions, detected near the side walls, respectively in the device at the state of the art and in the device according to the present invention.
Figure 13:
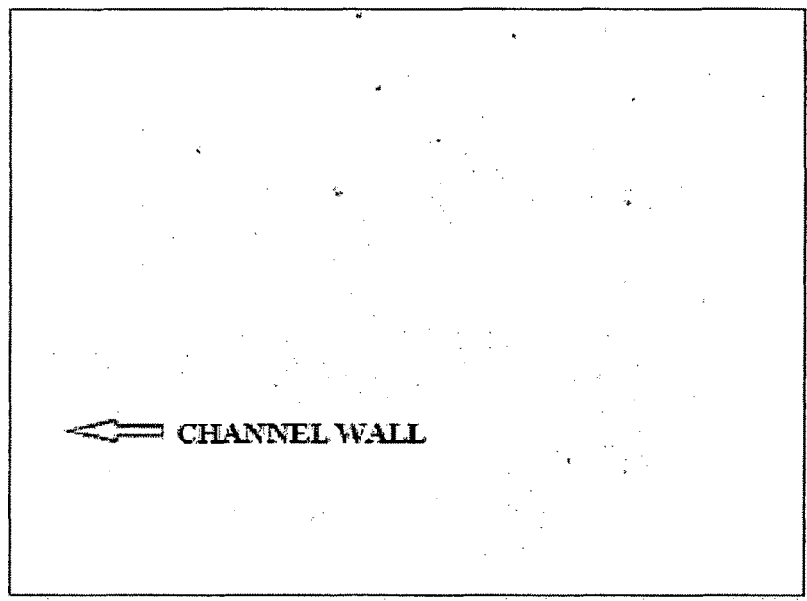
Figure 14:
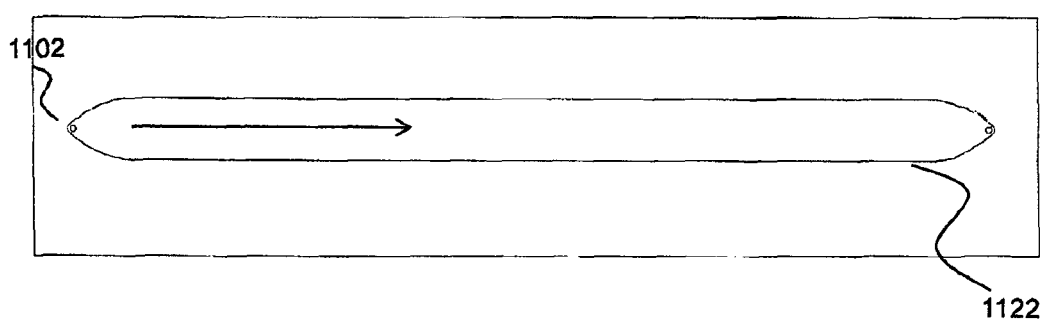
FIG. 14 schematically illustrates a detail of a fractionation device known from the prior art.

Moreover, pictures taken near the eluted fractions collection port in the device known at the state of art, but wherein the cellular material is injected through a port downstream the injection port of the mobile phase, and without the lateral flows (FIG. 13(A)) and the device according to the present invention (FIG. 13(B)). Cells injected through that injection port directly into the mobile phase flow, although they are more focused at the entrance for both geometries, in the case of the device according to the state of art, tends to expand and to distribute all along the section and come in touch with the walls of the channel. This happens because there is nothing confining the sample, which consequently expands near lateral walls. This effect does not happen into the device according to the present invention because cells are confined thanks to lateral flows.

The device according to the present invention may be produced such that is shown in FIGS. from 1 to 6. The injection ports of the mobile phase 311, 321 are advantageously arranged near the far end of the capillary channel. Ports flow to the summit of the terminal portions 241, 251 which subdivide the ends of the channel perimetric profile 211. These terminal portions promote the creation of the independent mobile phase injection flows into the channel, in order to develop the so-called "mobile walls" mentioned above.

Advantageously, the sample injection port of the destined to elution, is arranged on the longitudinal axis of the capillary channel according to the invention, near the baseline of the terminal portions.

The multiple fractionation channel device shown in the FIGS. 5 and 6 is moreover particularly and suited to treatment of samples with a large number of objects, as cells, in the range from 1 to 2 million of cells.

The solution for the multiple channel fractionation device is given by the production of a device with its own flows distribution duct system, in order to supply two, or more, capillary channels arranged into the multiple channel 2, with just one injection duct of the mobile phase, and similarly to have just one collection port of fractions eluted.

The underlayers 312, 322 e 332 that compose the top layer 302 allow to split the injection flow of the mobile phase and the sample injected into both the capillary channels 212, 222 delineated by the perimetric profile obtained into the middle layer 202. In this way, the multiple capillary channel obtained appears in a more compact, more efficient and more production form reliable than multiple channel device according to the state of art.

The multiple channel fractionation device allows very high fractionation performances and it is based on the same functional principle of the single capillary channel described before, shown in the FIGS. from 1 to 3 and it is implied that features described referring to FIGS. from 1 to 3 are also compatible and applicable to the configuration described in FIGS. 5 and 6 and vice versa. For example the control means 400 described in FIG. 1 are also useable by the device described in the FIGS. from 2 to 6. In the same way the injection wall 302 described referring to FIGS. 5 and 6 may be also used for the fractionation device 200 alternately to the injection wall 301.

Both devices are structurally designed by materials and manufacturing used in order to have the possibility to use the device according to the present invention as a disposable.

The present invention moreover refers to a method for the dynamic fractionation of a dispersed phase. Features according to the separation processes described referring to fractionation devices in the FIGS. from 1 to 13 are applicable to the method according to the present invention, which includes: a first confining fluid injected into a capillary channel through a first injection port and a second confining fluid through a second injection port. The first and the second confining fluid are respectively supplied with a first and a second predefined flow rate. The method moreover comprises an elution fluid injected in order to supply a mobile phase through a third injection port arranged between the first and the second injection port. The elution fluid has a third predefined flow rate, which is bigger than the first and the second predefined flow rates in order to confine the elution fluid between the first and the second confining fluid.

According to a production form of the present invention, method comprises the following steps:
a) Preparation of a cellular material sample dispersed into a mobile phase;
b) Injection of the sample by a continuous flow of a saline and biocompatible solution (mobile phase) perpendicularly to the lying plane of an appropriate fractionation device, comprising almost one capillary channel;
c) Sample elution into the device;
d) Fractions collection composed by the different cellular species that have been isolated in population or sub population starting from the starting sample.

After the sample injection step and before the sample elution step, optionally the elution fluid flow can be stopped. Alternately the injection and elution steps may be implemented without the mobile phase stop flow, so preventing the contact interaction with the accumulation wall of the device.

The mobile phase is supplied by a predefined flow rate into the central portion of fractionation device, near the lateral portion of said fractionation device and by a lower flow rate than the flow rate of central portion.

Method according to the present invention, wherein the first and the second injection flow rates of the first and the second confining fluids may be chosen in the range from 5% to 25% of the third predefined mobile phase flow rate of the elution fluid. In an advantageous form the first and the second predefined flow rates are 10% of the third predefined flow rate.

Method according to the present invention moreover is realized by setting the flow rate of the elution fluid and/or of the first and second confining fluids according to fractionation conditions and to the type of the sample injected. The term fractionation conditions denotes all the components parameters that are suitable for the instrumentation functioning and to the fractionation of the objects injected. For example the mobile phase composition (aqueous or organic solutions, with different pH, salinity, ionic strength, surfactants presence), the flow rate and velocity of the elution, the lateral and the injection flows, the stop of one or more flows for a certain time, the sample injected quantity and concentration, the analysis time, the steps of the system preparation and conditioning.

In the method and device described above, according to the present invention the dispersed phase can be composed by biological material and in particular cells and/or stem cells.

The features of the device and fractionation, device described referring to FIGS. from 1 to 4 and from 7 to 13 are clearly compatible with the device and the fractionation device and implementable in the device and in the fractionation element described according to FIGS. 5 and 6. More generally, features described according to the realization forms described referring to any figures can be implemented in realization forms described referring to the remaining figures.

What is claimed is:

1. Device for dynamic fractionation of a dispersed phase in a dispersing fluid, said device comprising:
   a fractionation channel,
   a first injection port through which a first confining fluid is injectable into the fractionation channel and a second injection port through which a second confining fluid is injectable into the fractionation channel,
   a third injection port through which an elution fluid for transporting the dispersed phase is injectable into the fractionation channel, the third injection port being arranged between the first and second injection ports,
   wherein a first end portion of the fractionation channel includes first to third terminal portions in correspondence to the first to third injection ports respectively, and
   wherein the first to third terminal portions are dimensioned such that the first and second confining fluids respectively have a first and second predefined flow rate and the elution fluid can have a third predefined flow rate, the third predefined flow rate being larger than the first and second flow rates so as to confine the elution fluid between the first and second confining fluid, wherein,
   the width of the base of the first and second terminal portions corresponding to the first and second injection ports, respectively, is in the range from 25% to 50% of the width of the base of the third terminal portion corresponding to the third injection port.

2. The device according to claim 1, wherein the first to third terminal portions are configured such that their respective longitudinal axes are parallel to each other and to the longitudinal axis of the fractionation channel, such that the elution fluid can flow parallel to the first and second confining fluid.

3. The device according to claim 1, wherein the first to third terminal portions are arch-shaped.

4. The device according to claim 1, further including a sample injection port for injecting in the fractionation channel the dispersed phase in a dispersing fluid, the sample injection port being positioned so as to allow injection of the dispersed phase into the elution fluid in the fractionation channel.

5. The device according to claim 1, further comprising:
at least one first stream control means in fluidic connection with the first to third injection port and adapted to control a flow of the elution fluid at the third predefined flow rate; wherein
the at least one first stream control means is further adapted to control a flow of the first confining fluid at the first predefined flow rate, and to control a flow of the second confining fluid at the second predefined flow rate.

6. Method for dynamic fractionation of a dispersed phase in a dispersing fluid, said method comprising the steps of:
injecting into a fractionation channel a first confining fluid through a first injection port and a second confining fluid through a second injection port, the first and second confining fluids being respectively supplied at a first and second predefined flow rate,
injecting into the fractionation channel, through a third injection port, arranged between the first and second injection ports, an elution fluid for supplying a mobile phase, the elution fluid being supplied at a third predefined flow rate,
wherein the third predefined flow rate is larger than the first and second predefined flow rates so as to confine the elution fluid between the first and second confining fluid, wherein,
the first and the second predefined flow rates of the first and second confining fluid are in the range from 5% to 25% of the third flow rate of the elution fluid.

7. The method according to claim 6, wherein the first and second confining fluid and the elution fluid are injected into the fractionation channel in correspondence to first to third terminal portions of a first end portion of the fractionation channel, respectively.

8. The method according to claim 6, wherein the first and second predefined flow rates of the first and second confining fluid are 10% of the third predefined flow rate.

9. The method according to claim 6, further comprising the steps of:
preparing a sample of a dispersed phase in a dispersing fluid,
introducing through a sample injection port the prepared sample into the elution fluid flowing through the fractionation channel,
eluting the prepared sample from the fractionation channel,
after the step of introducing the prepared sample and before the step of eluting the prepared sample, optionally interrupting the flow of the elution fluid.

10. The method according to claim 6, further comprising the step of setting the flow rate of the elution fluid and/or of the first and second confining fluid based on the fractionating conditions and/or on the type of injected sample.

11. The method according to claim 6, wherein the dispersed phase includes biological material, preferably cells and/or stem cells.

12. A fractionation device comprising:
a bottom layer;
a top layer;
a fractional channel placed between said bottom and top layers, one end of said fractional channel having a third terminal portion placed between a first and second terminal portion, another end of said fractional channel having a terminal end;
a first fluid injection port placed in the first terminal portion;
a second fluid injection port placed in the second terminal portion;
a third fluid injection port placed in the third terminal portion;
a sample injection port placed adjacent said third terminal portion;
a collection port placed adjacent the terminal end of said fractional channel;
fluid control means, coupled to said first, second, and third injection ports, for controlling fluid flow in each of said first, second, and third injection ports; and
wherein said fluid control means controls fluid flow in said first and second injection ports to be lower than fluid flow in said third injection port,
whereby fluid flow in said first and second injection ports is capable of confining fluid flow in said third injection port forming a central channel in said fractional channel and fluid flow in said first and second injection ports is capable of being different than fluid flow in said third injection port.

13. The fractionation device as in claim 12 wherein:
each of the first and second terminal portions has a first lateral width adjacent said fractional channel and the third terminal portion has a second lateral width adjacent said fractional channel that is twice the first lateral width.

* * * * *